(12) United States Patent
Schneggenburger et al.

(10) Patent No.: US 10,630,204 B2
(45) Date of Patent: Apr. 21, 2020

(54) NETWORK FEEDBACK UNIT TO FEED ENERGY INTO A THREE-PHASE NETWORK AND ELECTRICAL DRIVE SYSTEM

(71) Applicant: Schmidhauser AG, Romanshorn (CH)

(72) Inventors: Christof Schneggenburger, Amriswil (CH); Dirk Schekulin, Gais (CH)

(73) Assignee: Schmidhauser AG, Romanshorn (CH)

( * ) Notice: Subject to any disclaimer, the term of this patent is extended or adjusted under 35 U.S.C. 154(b) by 0 days.

(21) Appl. No.: 15/771,993

(22) PCT Filed: Oct. 28, 2016

(86) PCT No.: PCT/EP2016/076068
§ 371 (c)(1),
(2) Date: Apr. 27, 2018

(87) PCT Pub. No.: WO2017/072297
PCT Pub. Date: May 4, 2017

(65) Prior Publication Data
US 2018/0367062 A1    Dec. 20, 2018

(30) Foreign Application Priority Data

Oct. 30, 2015 (DE) .................. 10 2015 221 359

(51) Int. Cl.
*H02M 7/53* (2006.01)
*H02M 7/5387* (2007.01)
(Continued)

(52) U.S. Cl.
CPC ....... *H02M 7/5387* (2013.01); *H02M 3/1584* (2013.01); *H02M 7/5395* (2013.01);
(Continued)

(58) Field of Classification Search
CPC .. H02M 3/158; H02M 3/1584; H02M 3/1588; H02M 2001/0009
See application file for complete search history.

(56) References Cited

U.S. PATENT DOCUMENTS 5,381,328 A * 1/1995 Umezawa ............. H02M 7/493
363/41
8,901,899 B1 * 12/2014 Kiadeh ................. H02M 3/156
323/271
(Continued)

FOREIGN PATENT DOCUMENTS

CN      101278471 A    10/2008
CN      103151937 A    6/2013
(Continued)

OTHER PUBLICATIONS

Papadopoulos et al., "Comparison of Multilevel PWM Versus Interleaved Based Sinewave Shaping for Two-Stage Current Source Inverters Used in PV Applications", University of Nottingham, pp. 1-11.
(Continued)

*Primary Examiner* — Jeffrey A Gblende
*Assistant Examiner* — Lakaisha Jackson
(74) *Attorney, Agent, or Firm* — Crowell & Moring LLP

(57) ABSTRACT

A network feedback unit feeds electrical energy from a voltage intermediate circuit into a three-phase network. The network feedback unit has: a buck converter unit having first and second buck converters, the first buck and second buck converters being connected in parallel with the input side of each electrically coupled to the voltage intermediate circuit; an inverter, with the input side electrically coupled to an output of the buck converter unit and the output side electrically coupled to the three-phase network; at least one filter capacitor arranged at the output of the buck converter unit or at the output of the inverter; and a controller unit to
(Continued)

drive the first and second buck converter depending on a filter capacitor current such that the first and second buck converter contribute in equal parts to an output current of the buck converter unit.

10 Claims, 7 Drawing Sheets

(51) Int. Cl.
*H02M 3/158* (2006.01)
*H02M 7/5395* (2006.01)
*H02M 1/00* (2006.01)

(52) U.S. Cl.
CPC ............... *H02M 2001/007* (2013.01); *H02M 2001/0009* (2013.01)

(56) References Cited

U.S. PATENT DOCUMENTS

| | | | | |
|---|---|---|---|---|
| 2009/0219001 A1* | 9/2009 | Kimura | ............... | H02M 3/1582 323/282 |
| 2014/0241016 A1 | 8/2014 | Ho et al. | | |
| 2014/0328090 A1* | 11/2014 | Takahashi | ......... | H02M 3/33507 363/21.17 |
| 2015/0002112 A1 | 1/2015 | Tang et al. | | |
| 2015/0244301 A1* | 8/2015 | Sato | ........................ | H02P 27/06 318/139 |

FOREIGN PATENT DOCUMENTS

| | | | |
|---|---|---|---|
| CN | 104158242 A | 11/2014 | |
| DE | 10 2005 047 373 A1 | 4/2007 | |
| DE | 102005047373 A1 * | 4/2007 | ................ H02J 7/35 |
| DE | 10 2014 109 009 A1 | 12/2014 | |

OTHER PUBLICATIONS

Eirea et al., "Phase Current Unbalance Estimation in Multi-Phase Buck Converters", Electrical Engineering and Computer Science Department, University of California, Berkeley, pp. 1-6.

International Search Report (PCT/ISA/210) issued in PCT Application No. PCT/EP2016/076068 dated Feb. 10, 2017 with English-language translation (Five (5) pages).

German-language Written Opinion (PCT/ISA/237) issued in PCT Application No. PCT/EP2016/076068 dated Feb. 10, 2017 (Six (6) pages).

Partial English translation of Chinese Office Action issued in counterpart Chinese Application No. 21680077189.1 dated Sep. 23, 2019 (five (5) pages).

\* cited by examiner

NETWORK FEEDBACK UNIT TO FEED ENERGY INTO A THREE-PHASE NETWORK AND ELECTRICAL DRIVE SYSTEM

BACKGROUND AND SUMMARY OF THE INVENTION

The invention relates to a network feedback unit and an electrical drive system.

The invention is based on the object of providing a network feedback unit and an electrical drive system by means of which energy, for example braking energy, can be fed into and fed back from a network in a reliable manner and with a high degree of efficiency.

The invention achieves this object by way of a network feedback unit and an electrical drive system in accordance with embodiments of the invention.

The network feedback unit is designed to feed electrical energy from an intermediate circuit into a three-phase network.

The network feedback unit has a buck converter unit. The buck converter unit has a first buck converter and a second buck converter. It goes without saying that the buck converter unit can also have more than two buck converters. In the following text, the invention is described by way of example for two buck converters. The input side and the output side of the first buck converter and the second buck converter are connected in parallel and the input side of each of which is electrically coupled to the voltage intermediate circuit.

The network feedback unit furthermore has an inverter, the input side of which is electrically coupled to an output of the buck converter unit and the output side of which is electrically coupled to the three-phase network. The inverter is typically a current-fed or voltage-fed commutator.

The network feedback unit furthermore has at least one filter capacitor, which is arranged at the output of the buck converter unit. Alternatively or in addition, one or more filter capacitors can be arranged at the output of the inverter.

The network feedback unit furthermore has a controller unit, for example in the form of a microprocessor or FPGA and associated hardware and software, which is designed to drive or operate the first buck converter and the second buck converter depending on a filter capacitor current, that is to say a current flowing through the filter capacitor, in such a way that the first buck converter and the second buck converter contribute on average over time in equal parts to an output current of the buck converter unit. In the ideal case, the first buck converter and the second buck converter are driven in such a way that the first buck converter and the second buck converter each deliver on average over time approximately half of the output current of the buck converter unit. If the network feedback unit has n buck converters, a respective buck converter delivers 1/nth of the output current of the buck converter unit, wherein n represents a natural number and n>1 holds true.

The buck converters can each be operated based on pulse-width modulation, wherein a duty cycle within a respective (PWM) period of the pulse-width modulation is conventionally set for this purpose, wherein the duty cycle influences an output current of the respective buck converter, for example. The buck converters can be operated within a respective period in a staggered manner. If the buck converter unit has, for example, two buck converters, the two buck converters can be clocked in a manner staggered by 180 degrees. For this case, the controller unit can be designed to drive or operate the first buck converter and the second buck converter depending on the filter capacitor current in such a way that the first buck converter and the second buck converter contribute on average over time over a respective period of the pulse-width modulation in equal parts to an output current of the buck converter unit.

The filter capacitor can be arranged at the output of the buck converter unit, for example looped in or connected between output connection poles of the buck converter unit. The network feedback unit can have a current sensor, in particular arranged in the filter current path, which current sensor is designed to measure the filter capacitor current.

The network feedback unit can have a number of filter capacitors at the output of the inverter, for example exactly three filter capacitors. The network feedback unit can have an, in particular corresponding or identical, number of current sensors, wherein the current sensors are each designed to measure an associated filter capacitor current. A first current sensor can measure, for example, a first filter capacitor current, a second current sensor can measure, for example, a second filter capacitor current and a third current sensor can measure, for example, a third filter capacitor current.

The controller unit can have an intermediate circuit voltage controller, which is designed to regulate an intermediate circuit voltage to a setpoint value. The intermediate circuit voltage controller can output an output current setpoint value for the buck converter unit as a manipulated variable. The controller unit can furthermore have a buck converter unit current controller, which is designed, depending on a difference between the output current setpoint value and the output current (actual value) of the buck converter unit and also depending on a balancing signal, to generate a first current setting signal and a second current setting signal. The first current setting signal in this case determines an output current of the first buck converter and the second current setting signal accordingly determines an output current of the second buck converter. The controller unit can have a balancing signal generation unit, which is designed to generate the balancing signal depending on the filter capacitor current in such a way that the balancing signal is dependent on the parts in which the first buck converter and the second buck converter contribute to the output current of the buck converter unit.

The first buck converter and the second buck converter can each have at least one semiconductor switching means, in particular exactly two semiconductor switching means. The controller unit can have a first PWM generation unit, wherein the first PWM generation unit is designed to generate a first pulse-width-modulated drive signal for the at least one semiconductor switching means of the first buck converter depending on the first current setting signal. The controller unit can furthermore have a second PWM generation unit, wherein the second PWM generation unit is designed to generate a second pulse-width-modulated drive signal for the at least one semiconductor switching means of the second buck converter depending on the second current setting signal. The controller unit can furthermore have a current sensor, which is designed to measure the filter capacitor current. The balancing signal generation unit can have a comparator, which is operatively connected to the current sensor, said comparator being designed to output a comparator signal having a first logic state, for example one, when the filter capacitor current is greater than an upper threshold value and to output the comparator signal having a second logic state, for example zero, when the filter capacitor current is lower than a lower threshold value. The upper and the lower threshold value can be identical or can differ in order to implement hysteresis. The balancing signal generation unit can furthermore have a logic unit having at least one logic gate, at least one integrating element and/or at least one sampling element, wherein the logic unit is supplied with the comparator signal and the pulse-width-modulated drive signals and is designed to generate the balancing signal depending on the comparator signal and the pulse-width-modulated drive signals.

The first buck converter and the second buck converter can each have a first commutation cell and a second commutation cell, wherein the first commutation cells have a capacitor, a diode and a semiconductor switching means, wherein the second commutation cells accordingly have a capacitor, a diode and a semiconductor switching means, wherein the capacitor of the first commutation cells and the capacitor of the second commutation cells are looped in series between input connection poles of the buck converter unit, wherein the controller unit has a voltage balancing unit, which is designed to drive the semiconductor switching means of the first commutation cells and the semiconductor switching means of the second commutation cells in such a way that identical voltages are set at the capacitor of the first commutation cells and the capacitor of the second commutation cells.

The network feedback unit can have an output current determination unit, which is designed to identify or synthesize the output current of the buck converter unit depending on the filter capacitor current or the filter capacitor currents and depending on phase output currents, which are fed or impressed into the three-phase network by means of the inverter.

The output current determination unit can have a selection unit, which is supplied with the phase output currents and a selection signal and which is designed to output a single one of the phase output currents depending on the selection signal. The output current determination unit can furthermore have a summer, which is supplied with the filter capacitor current and the phase output current output by the selection unit and which is designed to sum the filter capacitor current and the phase output current output by the selection unit, wherein the resulting sum represents the output current.

Alternatively, the output current determination unit can have a first selection unit, which is supplied with the phase output currents and a selection signal and which is designed to output a single one of the phase output currents depending on the selection signal, and a second selection unit, which is supplied with the filter capacitor currents and the selection signal and which is designed to output a single one of the filter capacitor currents depending on the selection signal. The output current determination unit can furthermore have a summer, which is supplied with the phase output current output by the first selection unit and with the filter capacitor current output by the second selection unit and which is designed to sum the selected phase output current and the selected filter capacitor current, wherein the resulting sum represents the output current.

The electrical drive system has: at least one electrical drive, at least one frequency converter for driving the electrical drive, wherein the frequency converter has an intermediate circuit and/or is electrically coupled to an intermediate circuit, and a network feedback unit, which is described above and coupled to the intermediate circuit and a three-phase network.

BRIEF DESCRIPTION OF THE DRAWINGS

The invention is described in detail below with reference to the drawings, in which.

DETAILED DESCRIPTION OF THE DRAWINGS

Figure 1:
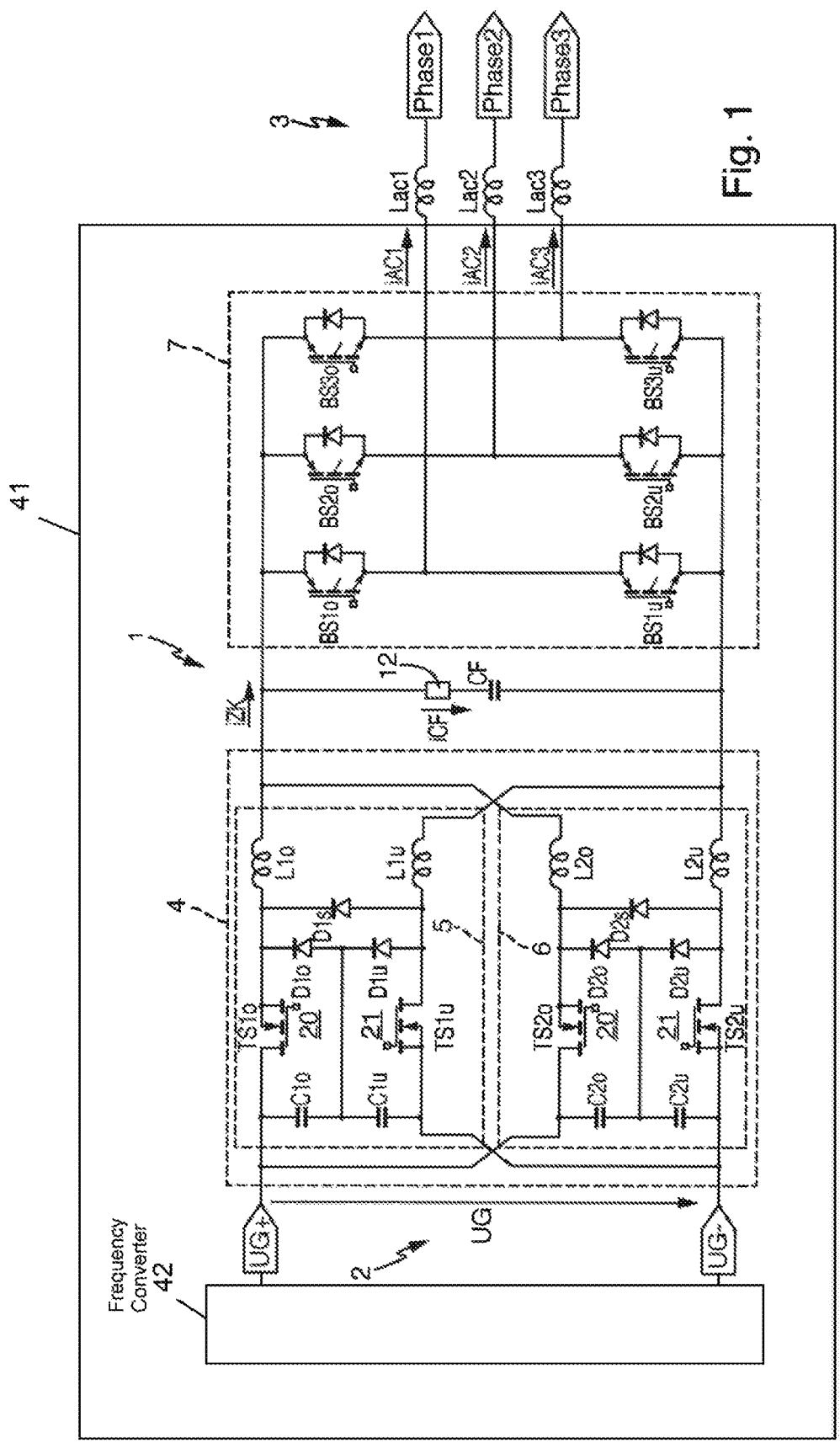
FIG. 1 shows a circuit diagram of a network feedback unit in accordance with a first embodiment.

FIG. 1 shows a circuit diagram of a network feedback unit 1 in accordance with a first embodiment. The network feedback unit 1, shown in electrical drive 41 and arranged downstream of frequency converter 42, is designed to feed excess electrical energy from an intermediate circuit 2 into a three-phase network 3. An excess of electrical energy can arise, for example, during braking operation in high-level installation drives.

The network feedback unit 1 has a buck converter unit 4 having a first buck converter 5 and a second buck converter 6, wherein the first buck converter 5 and the second buck converter 6 are connected in parallel and the input side of each of which is electrically coupled to the voltage intermediate circuit 2.

The network feedback unit 1 furthermore has an inverter 7, the input side of which is electrically coupled to an output of the buck converter unit 4 and the output side of which is electrically coupled to the three-phase network 3.

The first buck converter 5 and the second buck converter 6 each have a first commutation cell 20 and a second commutation cell 21, wherein the first commutation cells 20 have a capacitor $C1o$ and $C2o$, a diode $D1o$ and $D2o$, and a semiconductor switching means $TS1o$ and $TS2o$. The second commutation cells 21 each accordingly have a capacitor $C1u$ and $C2u$, a diode $D1u$ and $D2u$, and a semiconductor switching means $TS1u$ and $TS2u$. The respective capacitor $C1o$ or $C2o$ of the first commutation cells 20 and the respective capacitor $C1u$ or $C2u$ of the second commutation cells 21 are looped in series between input connection poles $UG+$, $UG-$ of the buck converter unit 4.

In other words, FIG. 1 shows a topology having two symmetrical buck converters 5 and 6 connected in parallel and a voltage-fed inverter or commutator (IGBT bridge) 7 connected downstream. The symmetrical buck converters 5 and 6 each have an upper commutation cell 20 composed of transistor switch $TS1o$, diode $D1o$ and capacitor $C1o$ and transistor switch $TS2o$, diode $D2o$ and capacitor $C2o$, and a lower commutation cell 21 composed of transistor switch $TS1u$, diode $D1u$ and capacitor $C1u$ and transistor switch $TS2u$, diode $D2u$ and capacitor $C2u$.

Diodes $D1s$ and $D2s$ serve to reduce losses in the event of freewheeling and are dimensioned in such a way that they have a lower voltage drop than the two series-connected diodes of the lower and upper commutation cells 20 and 21.

Inductances L1o, L1u, L2o, L2u form, together with the commutation cells 20, 21, the respective buck converters, the output of which forms a current intermediate circuit. Said current intermediate circuit is connected to a transistor bridge 7 (for example composed of IGBTs) having upper bridge switches BSio and lower bridge switches BSiu and is connected to the filter capacitor CF. Outputs of the transistor bridge 7 are connected to the AC network 3 via three further inductances Laci. The inductances form, together with the capacitor CF, the structure of a T filter.

The network feedback unit 1 has a current sensor 12 arranged in the filter current path, which current sensor measures a filter capacitor current iCF.

Figure 2:
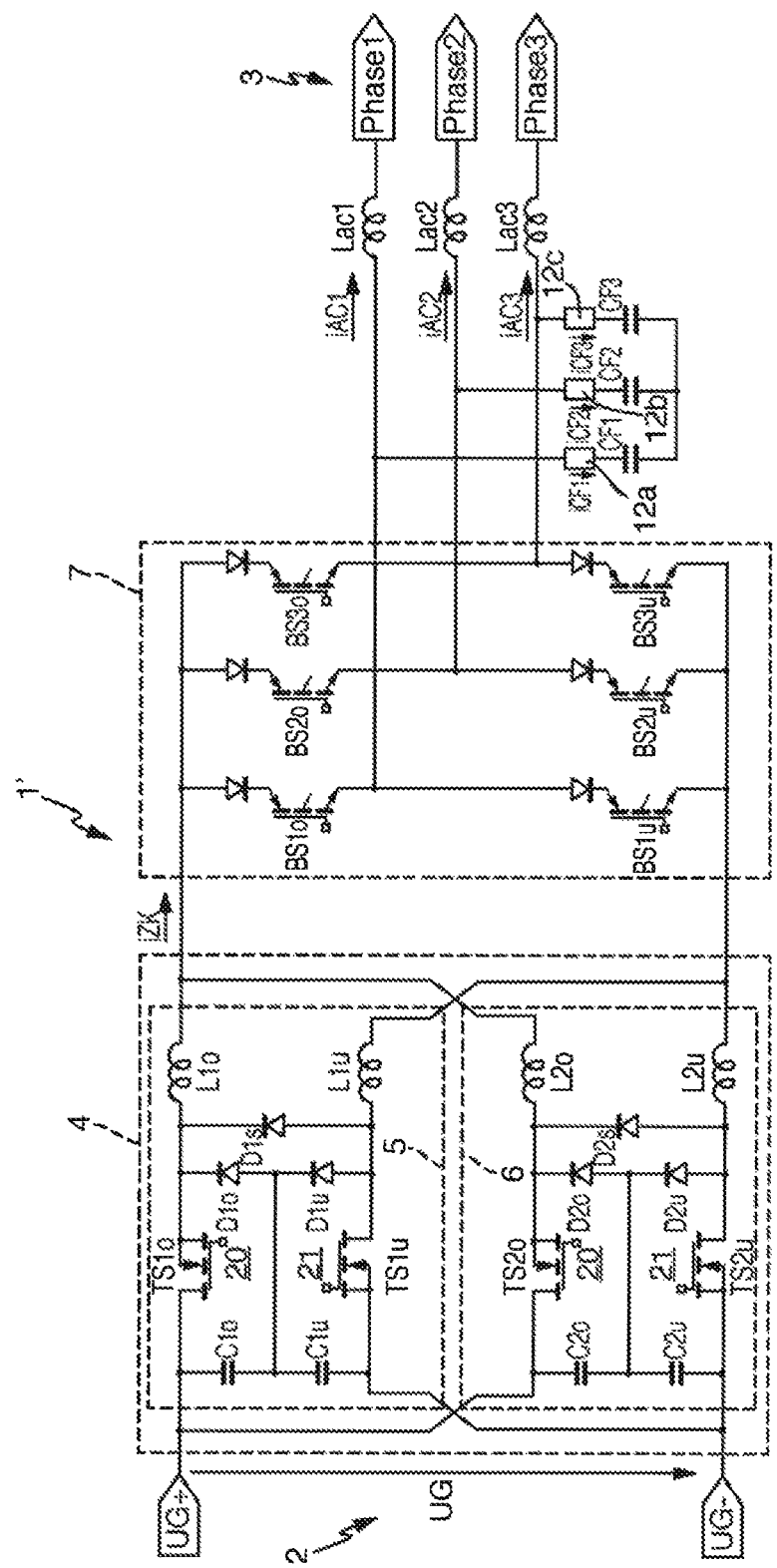
FIG. 2 shows a circuit diagram of a network feedback unit in accordance with a further embodiment.

FIG. 2 shows a variant of the topology shown in FIG. 1 having a current-fed inverter or commutator 7, in which the bridge is implemented using reverse-blocking transistors and the filter capacitance in the form of three filter capacitors CF1, CF2, CF3 is shifted to the AC side. In principle, the filter capacitors CF1 to CF3 could also be interconnected in delta arrangement. Otherwise, reference is made to the statements with respect to FIG. 1.

Figure 3:
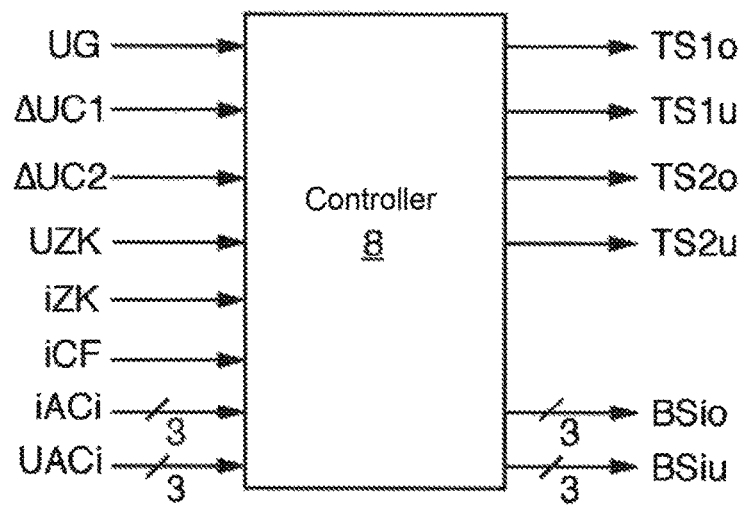
FIG. 3 shows a highly schematic block circuit diagram of a controller unit of the network feedback unit shown in FIGS. 1 and 2.

FIG. 3 shows a schematic block circuit diagram of a controller unit 8 of the network feedback unit shown in FIG. 1 or 2.

The controller unit 8 has (among others) the following input variables and output variables:
Input variables of the controller unit 8 are:

| | |
|---|---|
| UG | Intermediate circuit voltage (input voltage of the buck converter unit 4) |
| ΔUC1 | Differential input voltage of the $1^{st}$ buck converter 5 |
| ΔUC2 | Differential input voltage of the $2^{nd}$ buck converter 6 |
| UZK | Output voltage of the buck converter unit 4 |
| iZK | Output current of the buck converter unit 4 |
| iACi | Phase output currents (3 phases) |
| UACi | Phase star voltages of the AC network (3 phases) |

Output variables of the controller unit 8 are:

| | |
|---|---|
| TSio | Drive signals for the transistor switches of the upper commutation cells 20 |
| TSiu | Drive signals for the transistor switches of the lower commutation cells 21 |
| BSio | Drive signals for upper bridge switches of the inverter 7 |
| BSiu | Drive signals for lower bridge switches of the inverter 7 |

The bridge switches BSio and BSiu are controlled based on the natural commutation times directly from the measurement of the star voltages. In this respect, reference is also made to the prior art.

Figure 4:
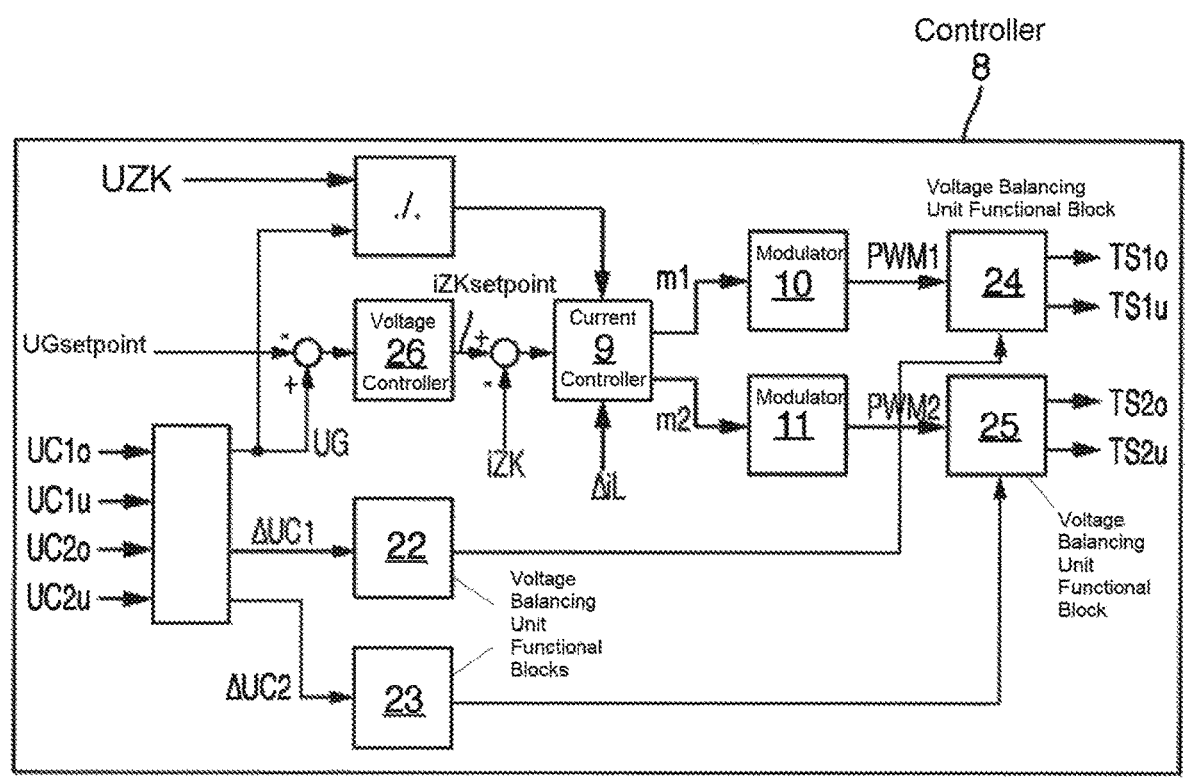
FIG. 4 shows a block circuit diagram of a basic structure of the controller unit shown in FIG. 3.

FIG. 4 shows a block circuit diagram of a basic structure of the controller unit 8 shown in FIG. 3.

Regulation is carried out at constant input voltage or intermediate circuit voltage UG, for example 20 V over a rectified network voltage, wherein a power-dependent steady regulation deviation is possible depending on regulation characteristics.

An intermediate circuit voltage controller 26 outputs an output current setpoint value iZKsetpoint for the buck converter unit 4 as a manipulated variable. The manipulated variable iZKsetpoint output forms the setpoint value for a buck converter unit current controller 9.

The buck converter unit current controller 9 generates manipulated variables in the form of a first current setting signal m1 and a second current setting signal m2 depending on the regulation difference iZKsetpoint-iZK and on a balancing signal or a current balancing difference ΔiL, wherein the first current setting signal m1 influences an output current of the first buck converter 5 and the second current setting signal m2 influences an output current of the second buck converter 6.

The current setting signals m1 and m2 serve as input signals for PWM generation units or modulators 10 and 11, which deliver pulse-width-modulated signals PWM1 and PWM2 that are staggered by 180 degrees as the output signals.

A voltage balancing unit having the functional blocks 22, 23, 23, 25 generates switching signals for the respective upper and lower transistor switch TSio and TSiu of the buck converters 5 and 6 depending on occurring voltage differences between upper and lower commutation cells 20 and 21. Voltage balancing can be effected, for example, by virtue of a differential-voltage-dependent shortening or lengthening of the respective on phase of the transistor switch TSio or TSiu of the upper or lower commutation cell.

Figure 5:
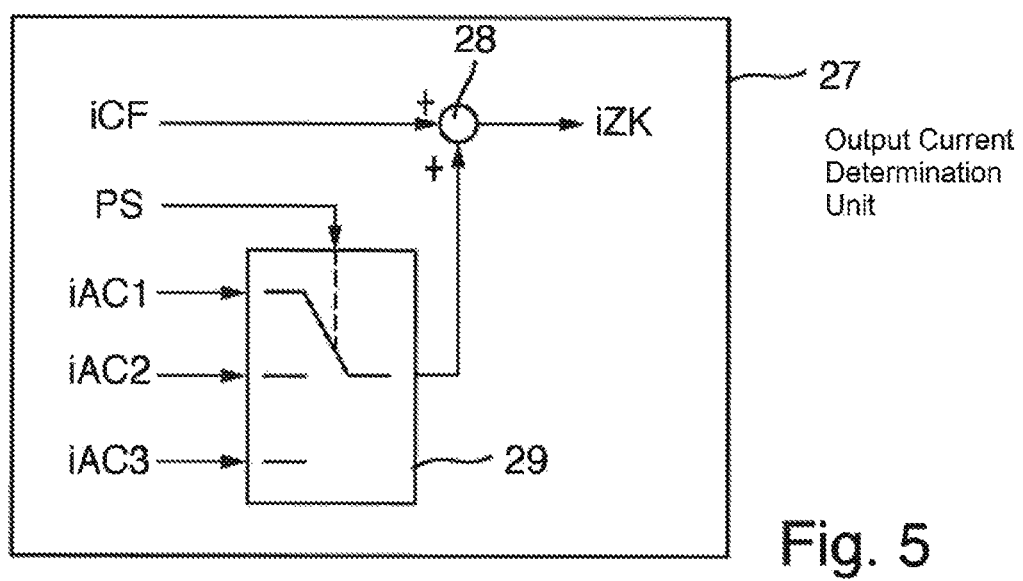
FIG. 5 shows a block circuit diagram of an output current determination unit of the network feedback unit shown in FIG. 1.

FIG. 5 shows a block circuit diagram of an output current determination unit 27 of the network feedback unit 1 shown in FIG. 1. The output current iZK of the buck converter unit 4 is obtained by adding the measured capacitor current iCF and a phase output current selected from the phase output currents iAC1, iAC2 and iAC3. The addition is performed by means of a summer 28. The phase output currents iAC1, iAC2 and iAC3 are conventionally measured by means of current sensors (not illustrated). The phase output current is selected by means of a selection unit 29, which is driven by means of a phase switchover signal PS, which is already used for controlling the output bridge 7.

The embodiment shown in FIG. 5 can be implemented in a very cost-effective manner since the output current iZK is not measured directly by means of a fast and accordingly expensive current sensor but instead is measured indirectly by means of a slow current sensor on the AC side and by means of the current sensor 12, which can be implemented as a current transformer, for example.

Figure 6:
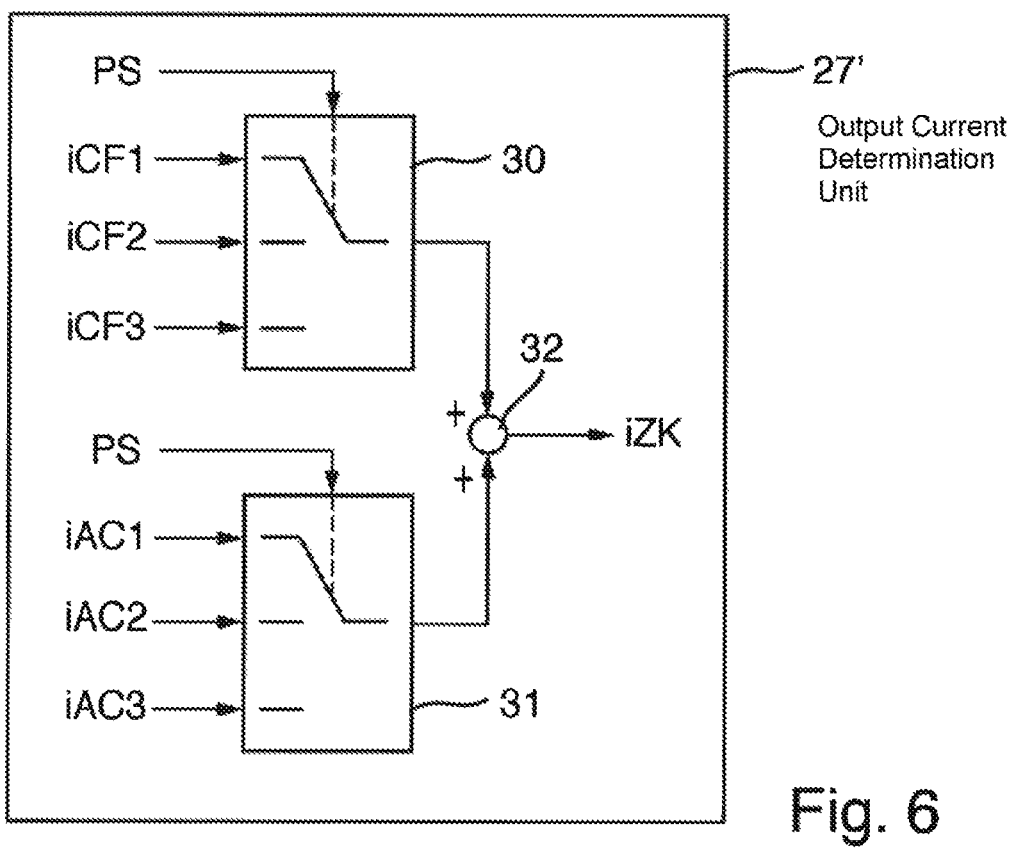
FIG. 6 shows a block circuit diagram of an output current determination unit of the network feedback unit shown in FIG. 2.

FIG. 6 shows a block circuit diagram of an alternative output current determination unit 27' of the network feedback unit 1' shown in FIG. 2. With reference to the output current determination unit 27 from FIG. 5, both the AC signals iACi and the filter capacitor current signals iCFi have to be selected, that is to say two selection units 30 and 31 are required.

Figure 7:
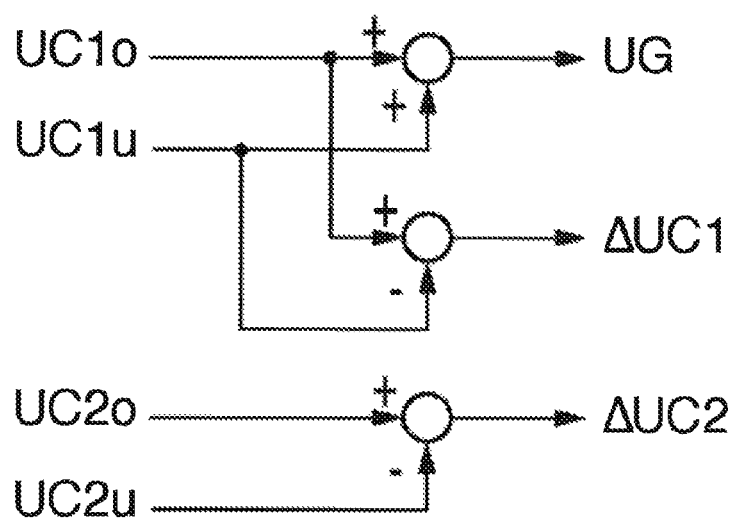
FIG. 7 shows a block circuit diagram of a unit for synthesizing actual values of an intermediate circuit voltage.

FIG. 7 shows the generation of the voltage signals for the controller unit 8 from FIGS. 3 and 4. Alternatively, the input voltage UG could also be measured from UC2o and UC2u or else directly.

In the ideal case, the buck converters 5 and 6 should contribute in equal parts to the output current iZK of the buck converter unit 4. The parts in which the buck converters 5 and 6 actually contribute to the output current iZK is identified depending on the filter capacitor current iCF or one of the filter capacitor currents iCF1, iCF2, iCF3.

Figure 8:
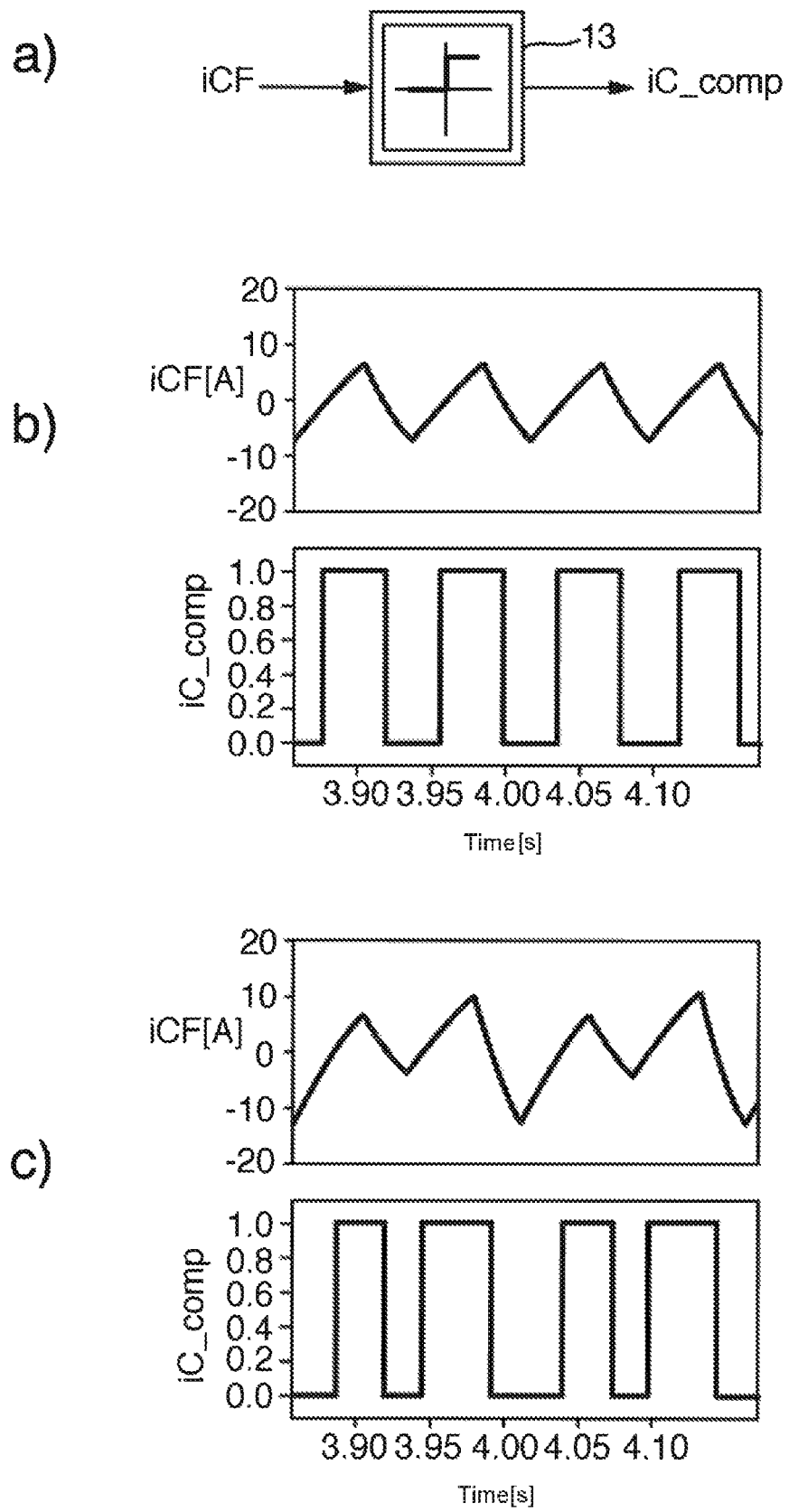
FIGS. 8a-c show a comparator and associated signal profiles and FIG. 9 shows a block circuit diagram of a balancing signal generation unit.

FIG. 8a shows a comparator 13, which is operatively connected to the current sensor 12, which comparator is designed to output a comparator signal iC_comp having a logic state of one when the filter capacitor current iCF is greater than an upper threshold value and to output the comparator signal iC_comp having a logic state of zero when the filter capacitor current iCF is lower than a lower threshold value. The comparator 13 consequently generates a square-wave signal from the typically triangular-wave filter capacitor current iCF that is free of DC current.

FIGS. 8b and 8c each show a profile of the filter capacitor current iCF and an associated profile of the comparator signal iC_comp for the case of two buck converters 5 and 6 connected in parallel and ideally staggered clocking (180 degrees) within a PWM period and providing that the inductors Lio and Liu of the buck converters 5 and 6 have a significant response of L=L(i). That is to say that with increasing current i, the modulation increases and the inductance L becomes lower. This is always the case with the powder-core inductors (all common material mixtures) that are preferably used.

Image 8b shows the case of complete balancing, that is to say the buck converters 5 and 6 contribute (on average over time over a PWM period) in equal parts to the output current iZK of the buck converter unit 4. Both current ripples are exactly the same size within the PWM period. The voltage/time integrals of the associated square-wave signals are therefore identical.

Image 8c shows the case of different current components of the buck converters 5 and 6 connected in parallel. As a result of the L(i) characteristic, that buck converter with the greater average current has a lower inductance of its inductor and thus a higher current ripple than the other buck converter. The summation current is the illustrated filter capacitor current iCF. After the comparator 13, different square-wave integrals are then produced, which can be used advantageously for the regulation of the current balancing.

Figure 9:
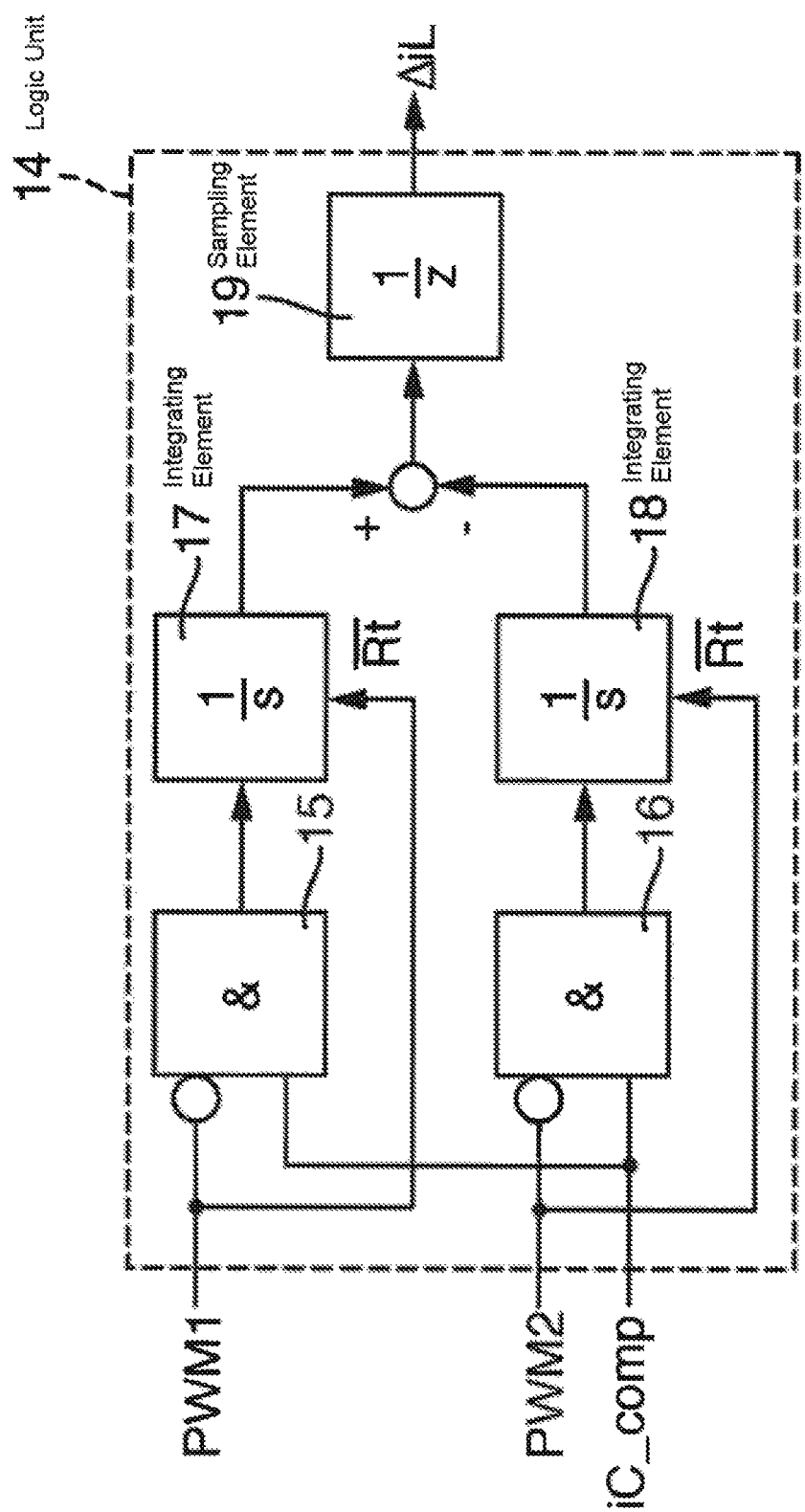

FIG. 9 shows one possible arrangement in the form of a logic unit 14 for evaluating the imbalance in the filter capacitor current iCF. In the circuit shown, the logic unit 14 has two logic gates 15, 16, two integrating elements 17, 18 and a sampling element 19, wherein the logic unit 14 is supplied with the comparator signal iC_comp and the pulse-width-modulated drive signals PWM1, PWM2 and is designed to generate the balancing signal ΔiL depending on the comparator signal iC_comp and the pulse-width-modulated drive signals PWM1, PWM2.

The logic gates 15, 16 logically link the comparator signal iC_comp with the corresponding PWM signals PWM1 and PWM2. Furthermore, the comparator signal iC_comp is partially integrated by virtue of the integrating elements 17 and 18 being reset to the falling edges of the corresponding PWM signals PWM1 and PWM2. The difference of the integrated signals is sampled discretely by means of the sampling element 19 and is supplied to the buck converter unit current controller 9 as a current balancing difference ΔiL. A suitable control loop within the buck converter unit current controller 9 corrects the setting signals m1 and m2 depending on the current balancing difference ΔiL in such a way that the two buck converters 5 and 6 carry an identical current after an adjustment time.

For the network feedback unit 1' shown in FIG. 2, the balancing signal generation unit described above has to be modified appropriately.

The embodiments shown show symmetrically designed buck converters 5 and 6 connected in parallel and with staggered clocking in combination with an IGBT bridge 7.

In accordance with the invention, jumps in the potential of the input voltage or intermediate circuit voltage UG can be prevented, with the result that expedient EMC properties are produced.

In accordance with the invention, cost-effective and dynamically high-grade current measurement is possible from the combination of the less dynamic network current signal iACi with the fast AC measurement of the capacitor current iCF. All the state variables of the T filter can therefore be measured easily.

In accordance with the invention, current imbalances when using a plurality of buck converters can be prevented by evaluating the profile of the capacitor current.

In accordance with the invention, voltage imbalances in the upper and lower commutation cells 20 and 21 of the buck converters 5 and 6 can be corrected by evaluating the voltage difference of the input capacitors.

It goes without saying that more than two buck converters can also be used instead of the two buck converters 5 and 6.

What is claimed is:

1. A network feedback unit to feed electrical energy from a voltage intermediate circuit into a three-phase network, the network feedback unit comprising:
   a buck converter unit having a first buck converter and a second buck converter, wherein the first buck converter and the second buck converter are connected in parallel and an input side of each of which is electrically coupled to the voltage intermediate circuit;
   an inverter, an input side of which is electrically coupled to an output of the buck converter unit and an output side of which is electrically coupled to the three-phase network;
   at least one filter capacitor, which is arranged at the output of the buck converter unit or at the output of the inverter; and
   a controller unit, which drives the first buck converter and the second buck converter depending on a filter capacitor current such that the first buck converter and the second buck converter provide equal contributions to an output current of the buck converter unit,
   wherein the controller unit includes:
      an intermediate circuit voltage controller, which regulates an intermediate circuit voltage to a setpoint value, wherein the intermediate circuit voltage controller outputs an output current setpoint value of the buck converter unit as a manipulated variable;
      a buck converter unit current controller, which depending on a difference between the output current setpoint value of the buck converter unit and the output current of the buck converter unit and depending on a balancing signal, generates a first current setting signal and generates a second current setting signal, wherein the first current setting signal influences an output current of the first buck converter and the second current setting signal influences an output current of the second buck converter; and
      a balancing signal generation unit, which generates the balancing signal depending on the filter capacitor current such that the balancing signal is dependent on the equal parts in which the first buck converter and the second buck converter contribute to the output current of the buck converter unit.

2. The network feedback unit as claimed in claim 1, wherein
   the at least one filter capacitor is arranged at the output of the buck converter unit, and
   the network feedback unit further comprises a current sensor designed to measure the filter capacitor current.

3. The network feedback unit as claimed in claim 2, wherein the current sensor is arranged a current path of the at least one filter capacitor.

4. The network feedback unit as claimed in claim 1, wherein
   the network feedback unit has a number of filter capacitors at the output of the inverter, and
   the network feedback unit has a corresponding number of current sensors, wherein each of the corresponding number of current sensors measure a filter capacitor current of an associated one of the number of filter capacitors.

5. The network feedback unit as claimed in claim 1, wherein
the first buck converter and the second buck converter each have at least one semiconductor switching device, and
the controller unit further comprises:
a first PWM generation unit, wherein the first PWM generation unit generates a first pulse-width-modulated drive signal for the at least one semiconductor switching device of the first buck converter depending on the first current setting signal;
a second PWM generation unit, wherein the second PWM generation unit generates a second pulse-width-modulated drive signal for the at least one semiconductor switching device of the second buck converter depending on the second current setting signal; and
a current sensor, which measures the filter capacitor current,
wherein the balancing signal generation unit comprises:
a comparator, which is operatively connected to the current sensor, outputs a comparator signal having a first logic state when the filter capacitor current is greater than an upper threshold value and outputs the comparator signal having a second logic state when the filter capacitor current is lower than a lower threshold value; and
a logic unit having at least one logic gate, at least one integrating element and/or at least one sampling element, wherein the logic unit is supplied with the comparator signal and the pulse-width-modulated drive signals and generates the balancing signal depending on the comparator signal and the pulse-width-modulated drive signals.

6. The network feedback unit as claimed in claim 1, wherein
the first buck converter and the second buck converter each have a first commutation cell and a second commutation cell,
the first commutation cells have a capacitor, a diode and a semiconductor switching device,
the second commutation cells have a capacitor, a diode and a semiconductor switching device,
the capacitor of the first commutation cells and the capacitor of the second commutation cells are looped in series between input connection poles of the buck converter unit, and
the controller unit has a voltage balancing unit, which drives the semiconductor switching device of the first commutation cells and the semiconductor switching device of the second commutation cells such that identical voltages are set at the capacitor of the first commutation cells and the capacitor of the second commutation cells.

7. The network feedback unit as claimed in claim 1, further comprising:
an output current determination unit, which identifies the output current of the buck converter unit depending on the filter capacitor current and depending on phase output currents, which are fed into the three-phase network by way of the inverter.

8. The network feedback unit as claimed in claim 7, wherein the output current determination unit further comprises:
a selection unit, which is supplied with the phase output currents and a selection signal and which outputs one of the phase output currents depending on the selection signal; and
a summer, which is supplied with the filter capacitor current and the selected one of the phase output currents output by the selection unit and which sums the filter capacitor current and the selected one of the phase output currents output by the selection unit to form the output current.

9. The network feedback unit as claimed in claim 4, further comprising:
an output current determination unit, which identifies the output current of the buck converter unit depending on the filter capacitor current and depending on phase output currents, which are fed into the three-phase network by way of the inverter
wherein the output current determination unit further comprises:
a first selection unit, which is supplied with the phase output currents and a selection signal and which outputs one of the phase output currents depending on the selection signal;
a second selection unit, which is supplied with the filter capacitor currents and the selection signal and which outputs one of the filter capacitor currents depending on the selection signal;
a summer, which is supplied with the selected one of the phase output currents output by the first selection unit and with the selected one of the filter capacitor currents output by the second selection unit and which sums the selected phase output current and the selected filter capacitor current to form the output current.

10. An electrical drive system, comprising:
at least one electrical drive;
at least one frequency converter for driving the at least one electrical drive, wherein the at least one frequency converter has an intermediate circuit or is electrically coupled to an intermediate circuit; and
the network feedback unit as claimed in claim 1, which is coupled to the intermediate circuit and the three-phase network.

* * * * *